Patented Aug. 9, 1949

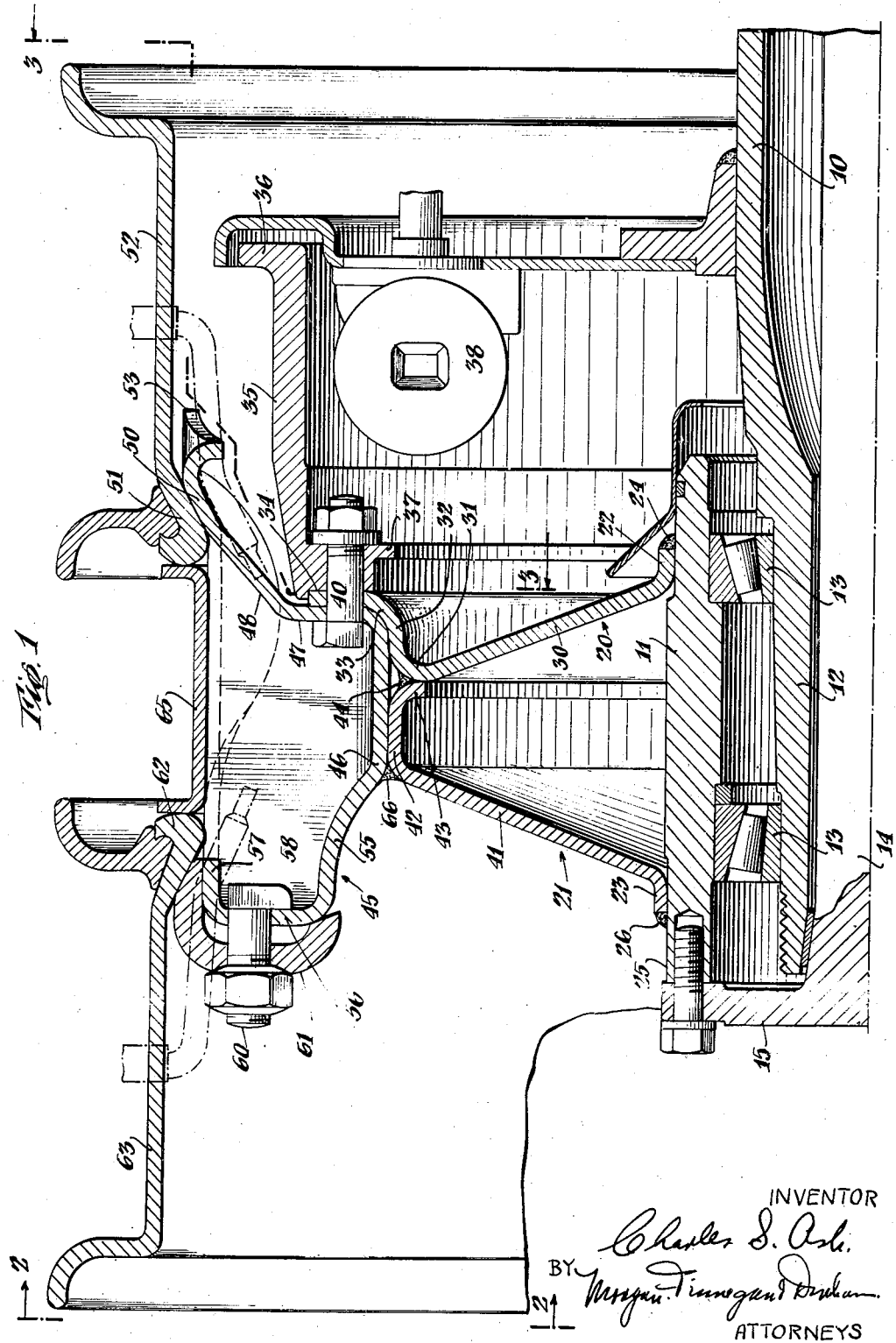

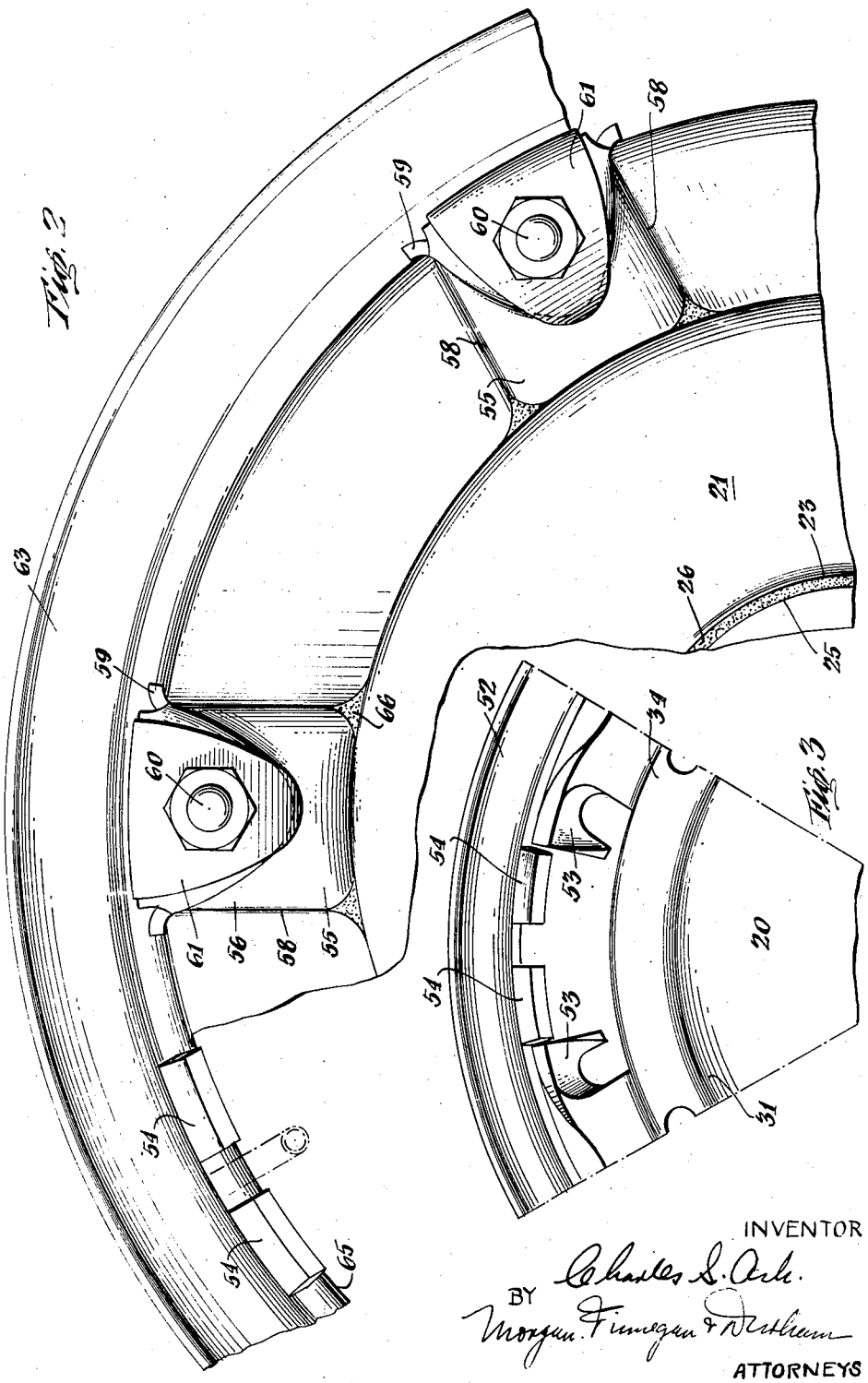

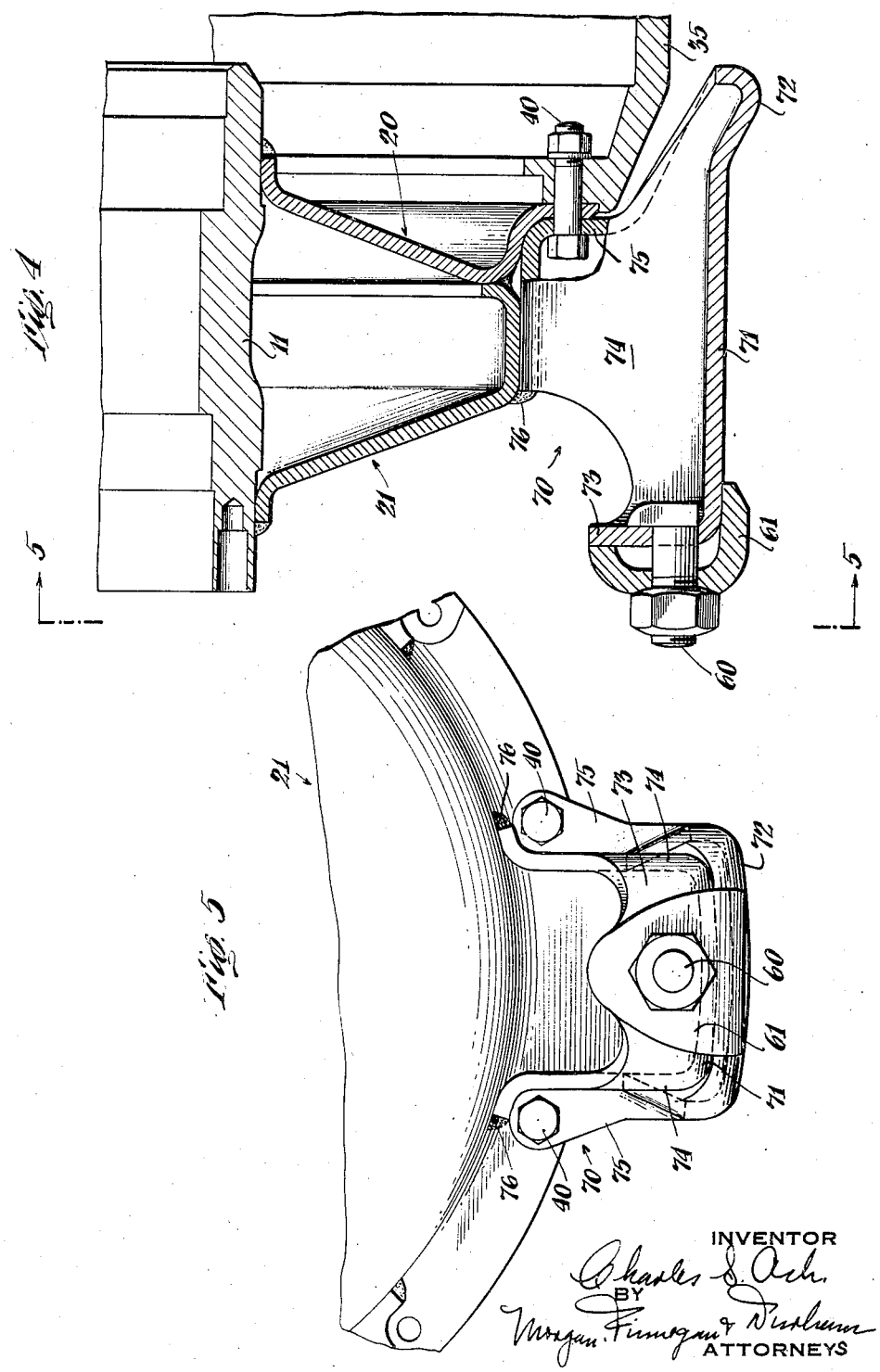

2,478,803

UNITED STATES PATENT OFFICE 2,478,803

VEHICLE WHEEL

Charles S. Ash, Milford, Mich.

Application May 22, 1946, Serial No. 671,466

6 Claims. (Cl. 301—6)

The present invention relates to an improved vehicle wheel and particularly to one adapted to removably mount a pair of tire rims. In certain of its aspects the invention further relates to a dual demountable rim wheel including braking means for the wheel.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a cross-sectional view of a typical and illustrative embodiment of the invention showing that part of a wheel above the rotational axis thereof;

Figure 2 is a fragmentary elevational view looking toward the outer end of the wheel as indicated by line 2—2 of Figure 1;

Figure 3 is another fragmentary elevation viewing the wheel as indicated by line 3—3 of Figure 1;

Figure 4 is a vertical cross section of a modified embodiment of the invention above the rotational axis thereof; and Figure 5 is a fragmentary elevation viewing the modified embodiment as indicated by 5—5 in Figure 4.

The invention has for its object the provision of a strongly fabricated composite wheel structure suitable for the heavier types of duty and adapted to demountably mount dual tire carrying rims. The invention further provides a composite dual rimmed vehicle wheel having suitable braking means therewith. Still another object is the provision of a vehicle wheel to fulfill the foregoing objects which is economical and relatively simple to build.

Referring now in detail to the illustrative embodiments of the invention shown by way of example in the accompanying drawings, and referring first to the embodiment of Figures 1 to 3 inclusive, the wheel is shown as mounted at the end of a driving axle 10 of a vehicle, the tubular hub 11 being mounted for rotation upon the reduced end or spindle 12 of the axle by means of anti-friction bearings 13. The tubular hub 11 is illustratively shown as driven by drive shaft 14 connected to the outer end of the hub by a head flange 15.

The body portion of the wheel is strongly and simply fashioned of a pair of pre-formed web members secured to the hub 11 and adapted to mount spoke members to receive dual rims, and a brake drum of efficient and inexpensive design. As best shown in Figure 1 of the drawings, the body of the wheel comprises an axially inner annular web member 20 and an axially outer web member 21. The web members 20 and 21 are provided with integral cylindrical portions 22 and 23 respectively at their inner peripheries, these portions being oppositely turned with respect to each other with each turned toward its respective end of hub 11. Cylindrical portions 22 and 23 are seated upon finished external surfaces 24 and 25 respectively at either end of hub 11, and webs 20 and 21 are strongly secured to the hub by circular welds 26 between the ends of portions 22 and 23 and surfaces 24 and 25.

As shown, the inner web 20 throughout its radial extent 30 has a frusto-conical formation extending from adjacent the inner end of hub 11 to a position centrally of the hub at its curved periphery 31. Said periphery 31 of the inner web is formed as a curved circular shoulder, the web being abruptly axially inwardly turned to form an axially extending portion 32 which merges with a further radially extending portion 33 extending to the outermost periphery of the web. The annular, radially extending portion 33 of the web is formed to lie in a plane substantially normal to the axis of the wheel, providing a plane inner surface 34 to receive a brake drum 35. The brake drum is fashioned as an axially extending cylinder thickened at its inner end as indicated at 36, and having at its outer end an integral attaching flange 37 extending a short radial distance inwardly and seating against surface 34. Bolts 40 through suitable apertures in portion 33 of web 20 and flange 37 securely hold the drum 35 to the wheel. Any suitable actuating mechanism, as for instance hydraulic cylinder 38 may be positioned within drum 35 and suitably anchored to force frictional elements into engagement with the drum.

The outer web 21 is formed similarly, but oppositely disposed, to the inner web in its radial extent as a frusto-conical portion 41. The portion 41 terminates at its outer periphery in an axially inwardly turned, cylindrically extending portion 42 which has an annular, inwardly radially turned end 43. The turned end portion 43 of web 21 is arranged to abut the inner web at its curved periphery or shoulder 31, and an external circular weld 44 joins the webs together.

A plurality of radially and axially extending spoke members 45 are provided on the composite web body portion 20—21 of the wheel. These spoke members are preferably each fabricated from a single blank of material and formed to provide base walls 46 which are substantially parallel to the axis of the wheel and adapted to seat on the axially extending wheel surface formed by portions 42 and 32 of webs 21 and 20 respectively. The spoke blanks are further formed to provide integral plane back walls 47 to seat against annular portion 34 of inner web 20. The drum mounting bolts 40 are arranged to be received in suitable apertures through spoke walls 47, so that the spokes are secured in place by the bolts as well as by welding, as will presently be described.

Above back wall 47 each spoke member 45 is formed with an axially inwardly inclined wall 48 which merges into an inclined seat 50, and these seats are adapted to receive the inclined edge or shoulder 51 of a conventional demountable rim 52 for the inner tire of the pair. The inclined seat portions 50 of certain of the spoke members 45 may have integral axially inwardly extending projections 53, as shown in Figs. 1 and 3, between which driving lugs 54, secured to the inner surface of rim 52, may be positioned when the rim is assembled. This arrangement provides for the proper centering of the inner rim 52 on the spokes in order that the entire dual rim assembly may be true when assembled, and also provides a positive driving connection between the wheel and rim.

Each spoke member 45 is further formed, toward its axially outer end, with a curved outwardly extending wall 55 merging into a radially extending plane wall portion 56 turned at its end into an axially inwardly extending portion 57. Side wall portions 58 are also provided in each spoke connecting wall portions 56, 55 and 47 already described. Side walls 58 are oppositely turned at their radially outer edges 59 (Fig. 2).

The front walls 56 of the spoke members provide foundations for mounting bolts 60 through suitable apertures therein, and also provide seats for lugs 61 adapted to engage the inclined edge or shoulder 62 of outer rim 63, which is preferably a duplicate of the inner rim 52 but oppositely disposed when assembled. A cylindrical spacing ring 65 is adapted to be positioned between rims 52 and 63 to hold them in proper relationship when assembled.

Each of the spoke members 45 is firmly secured in position on the wheel body portion 20—21 by welding 66, in addition to bolts 40.

The embodiment of the invention shown in Figs. 4 and 5 of the drawings is identical with the embodiment just described in so far as it comprises the hub 11, webs 20 and 21, and brake drum 35 secured to portion 33 of the inner web 20 by means of bolts 40. The formation of the spoke members 70 of this embodiment differs, however, from the structure shown in Figs. 1 to 3 inclusive.

As shown in Figs. 4 and 5, each of the spoke members 70 comprises a top wall 71 outwardly inclined at its inner end as indicated at 72 to provide a rim seat, and radially inwardly turned at 73 to provide a lug bolt and lug seat. Side walls 74 extend radially inwardly from the edges of wall 71, and are oppositely turned at their lower edges to seat on the axially extending portions 42 and 32 of wheel body portion 20—21. Webs 75 extending circumferentially of the wheel, integral with side walls 74, are suitably apertured to receive bolts 40 whereby spoke members 70 are held to plane portion 33 of the wheel. The spoke members are further assembled and held in place by welding 76 joining side walls 74 and the central body portion of the wheel.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a tubular hub, a pair of webs secured to the hub in spaced apart relationship, said webs being inclined toward each other and abutting radially outwardly of the hub, one of said webs having an integral annular flange portion extending radially outwardly beyond the abutting portions of said webs, a separately formed cylindrical brake drum secured to said flange portion, separately formed axially and radially extending spoke members seated on said webs, and means for mounting dual rims on said spoke members.

2. A vehicle wheel comprising, in combination, a tubular hub, a pair of webs secured to the hub in spaced apart relationship, said webs having frusto-conical portions immediately radially outwardly of said hub inclined toward and joined to each other at their outer peripheries, the inner of said webs having an integral annular flange portion extending radially outwardly beyond said frusto-conical portions of said webs, a separately formed cylindrical brake drum secured to said flange portion, separately formed axially and radially extending spoke members seated on said webs, and means for mounting dual rims on said spoke members.

3. A vehicle wheel comprising, in combination, a tubular hub, a pair of webs secured to the hub in spaced apart relationship, the outer of said webs being axially inwardly turned at its outer periphery and abutting and secured to the inner web, the inner web being axially inwardly turned at its outer periphery and thereafter radially outwardly turned in a flange portion in a plane substantially normal to the wheel axis, a plurality of hollow spoke members seated on and secured to said webs said members having rear walls abutting said flange portion, a cylindrical brake drum having a thickened portion abutting said flange portion, common means for holding said spoke members and said brake drum to said flange portion, and means for mounting a pair of rims on said spoke members.

4. A vehicle wheel comprising, in combination, a tubular hub, a pair of webs secured to the hub in spaced apart relationship, the outer of said webs being axially inwardly turned at its outer periphery in a cylindrical portion abutting and secured to the inner web, the inner web being axially inwardly turned at its outer periphery in a cylindrical portion and thereafter radially outwardly turned in a flange portion, a plurality of hollow spoke members having wall portions seated on said cylindrical portions and rear wall portions abutting said flange portion and secured thereto, a cylindrical brake drum abutting and secured to said flange portion, and means for mounting a pair of rims on said spoke members.

5. A vehicle wheel comprising, in combination, a tubular hub, a pair of webs secured to the hub in spaced apart relationship, the outer of said webs being axially inwardly turned at its outer periphery in a cylindrical portion abutting and secured to the inner web, the inner web being axially inwardly turned at its outer periphery in a cylindrical portion and thereafter radially outwardly turned in a flange portion, a plurality of hollow spoke members open at the top, having bottom walls seated on and secured to said cylindrical portions, rear walls abutting and secured to said flange portion, said rear walls having inclined radial extensions to seat an inner tire rim, and front walls to seat rim lugs, and means for removably mounting a pair of rims on said spoke members.

6. A vehicle wheel comprising, in combination, a tubular hub, a pair of webs secured to the hub in spaced apart relationship, the outer of said webs being axially inwardly turned at its outer periphery in a cylindrical portion abutting and secured to the inner web, the inner web being axially inwardly turned at its outer periphery in a cylindrical portion and thereafter radially outwardly turned in a flange portion, a plurality of hollow spoke members open at the bottom having top walls the axially inner ends of which are inclined to form a seat for a tire rim, side walls having curved lower edges seated on and secured to said cylindrical portions, circumferential extensions of said side walls abutting said flange portion and secured thereto, and front walls to seat rim lugs, and means for removably mounting a pair of rims on said spoke members.

CHARLES S. ASH.

REFERENCES CITED

The following references are of record in the file of this patent:

UNITED STATES PATENTS

| Number | Name | Date |
|---|---|---|
| 1,901,629 | Burger | Mar. 14, 1933 |
| 1,928,897 | Kay | Oct. 3, 1933 |

FOREIGN PATENTS

| Number | Country | Date |
|---|---|---|
| 545,776 | France | 1922 |